United States Patent [19]

Phillips et al.

[11] Patent Number: 5,567,020
[45] Date of Patent: *Oct. 22, 1996

[54] QUICK-RELEASE BICYCLE AXLE FASTENER

[75] Inventors: Cal M. Phillips, Platteville, Wis.; John V. Stewart, Orlando, Fla.

[73] Assignee: S.A.F.E.-Q.R. Corporation, Platteville, Wis.

[*] Notice: The term of this patent shall not extend beyond the expiration date of Pat. No. 5,383,716.

[21] Appl. No.: 494,031

[22] Filed: Jun. 26, 1995

[51] Int. Cl.$^6$ .................................................. B60B 27/00
[52] U.S. Cl. .................................... 301/124.2; 301/110.5
[58] Field of Search ................................ 301/110.5, 111, 301/124.2

[56] References Cited

U.S. PATENT DOCUMENTS

| | | | |
|---|---|---|---|
| 2,630,020 | 3/1953 | Juy | 74/242.14 |
| 3,922,018 | 11/1975 | Shook | 301/105 |
| 4,033,627 | 7/1977 | Morroni | 301/111 |
| 4,079,958 | 3/1978 | Segawa | 280/279 |
| 4,400,038 | 8/1983 | Hosokawa | 301/111 |
| 4,679,862 | 7/1987 | Luo | 301/112 |
| 4,724,692 | 2/1988 | Turin et al. | 70/225 |
| 4,763,957 | 8/1988 | Poehlmann et al. | 301/105 B |
| 4,770,011 | 9/1988 | Constant | 70/225 |
| 4,789,206 | 12/1988 | Ozaki | 301/111 |
| 4,805,941 | 2/1989 | Downing | 280/279 |
| 4,906,053 | 3/1990 | Kawai | 301/105 B |
| 4,964,287 | 10/1990 | Gaul | 70/233 |
| 5,118,125 | 6/1992 | Plunkett | 280/279 |
| 5,121,973 | 6/1992 | Phillips | 301/105 B |
| 5,249,879 | 10/1993 | Zoor | 403/374 |
| 5,257,855 | 11/1993 | Nagano | 301/110.5 |
| 5,383,716 | 1/1995 | Stewart et al. | 301/124.2 |

FOREIGN PATENT DOCUMENTS

| | | |
|---|---|---|
| 441058 | 3/1948 | Italy . |
| 460058 | 10/1950 | Italy . |
| 463954 | 2/1952 | Italy . |
| 341220 | 1/1931 | United Kingdom . |

*Primary Examiner*—David M. Mitchell
*Assistant Examiner*—Jonathan J. Yun
*Attorney, Agent, or Firm*—John V. Stewart

[57] ABSTRACT

A quick-release bicycle axle fastener for standard hollow axles and standard safety drop-outs, comprising a control rod through the axle; a mount attached to one or both ends of the control rod; a cam lever attached to each mount; a washer with a finger grip, slidably mounted on the control rod inboard of the mount, shaped to engage the safety drop-out when pressed against it; and a spring urging the washer against the drop-out at all times. The cam forces the washer inward against the drop-out for clamping attachment of the wheel axle to the drop-out. When cam pressure is released, the interlock washer continues to be urged against the drop-out by the spring for safety until the washer is pulled outward by the fingers of a user. When the wheel is re-installed, the washer automatically shifts into engagement with the coupling surface of the drop-out, providing an automatic, undefeatable safety backup for the cam.

16 Claims, 10 Drawing Sheets

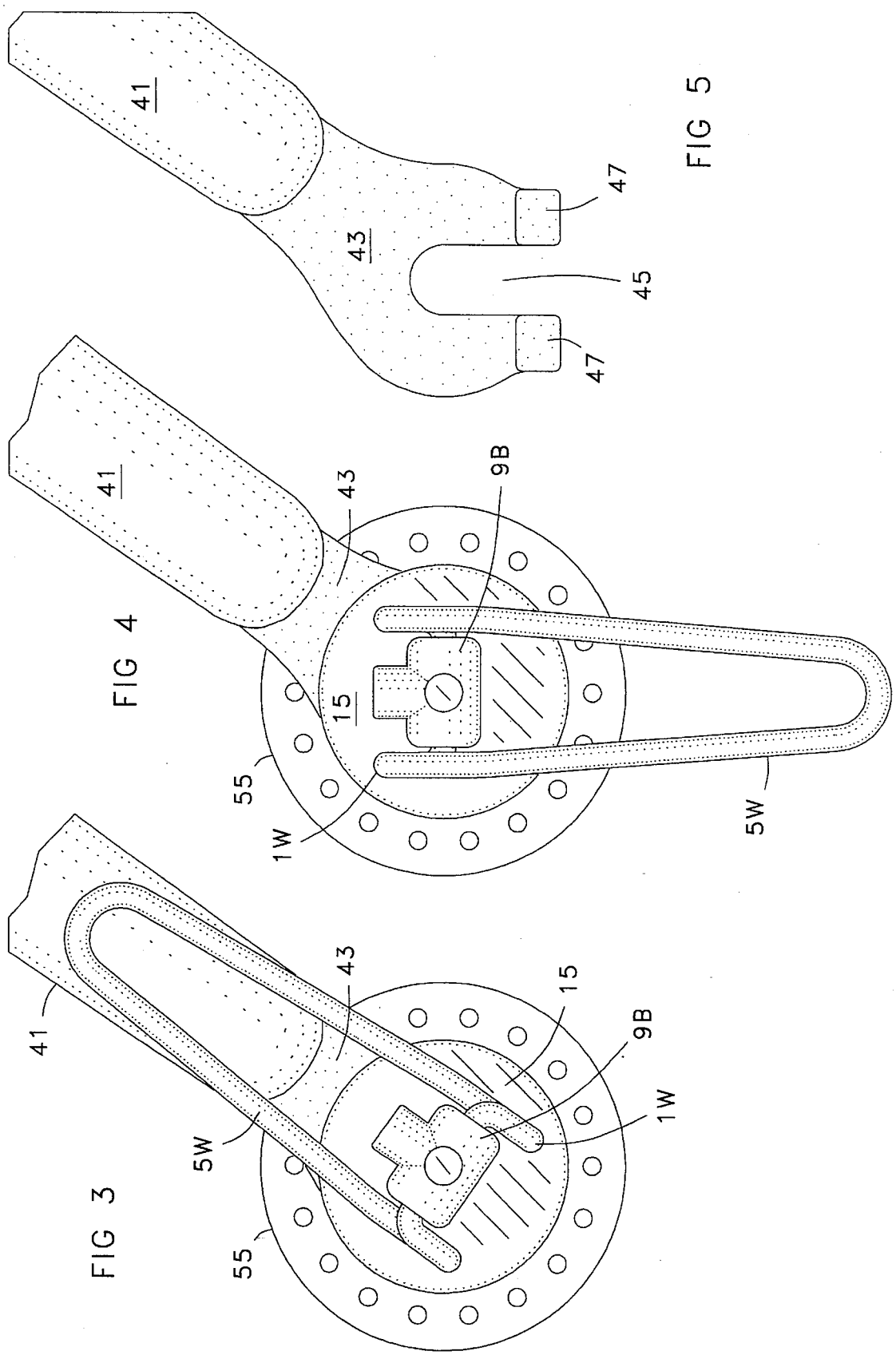

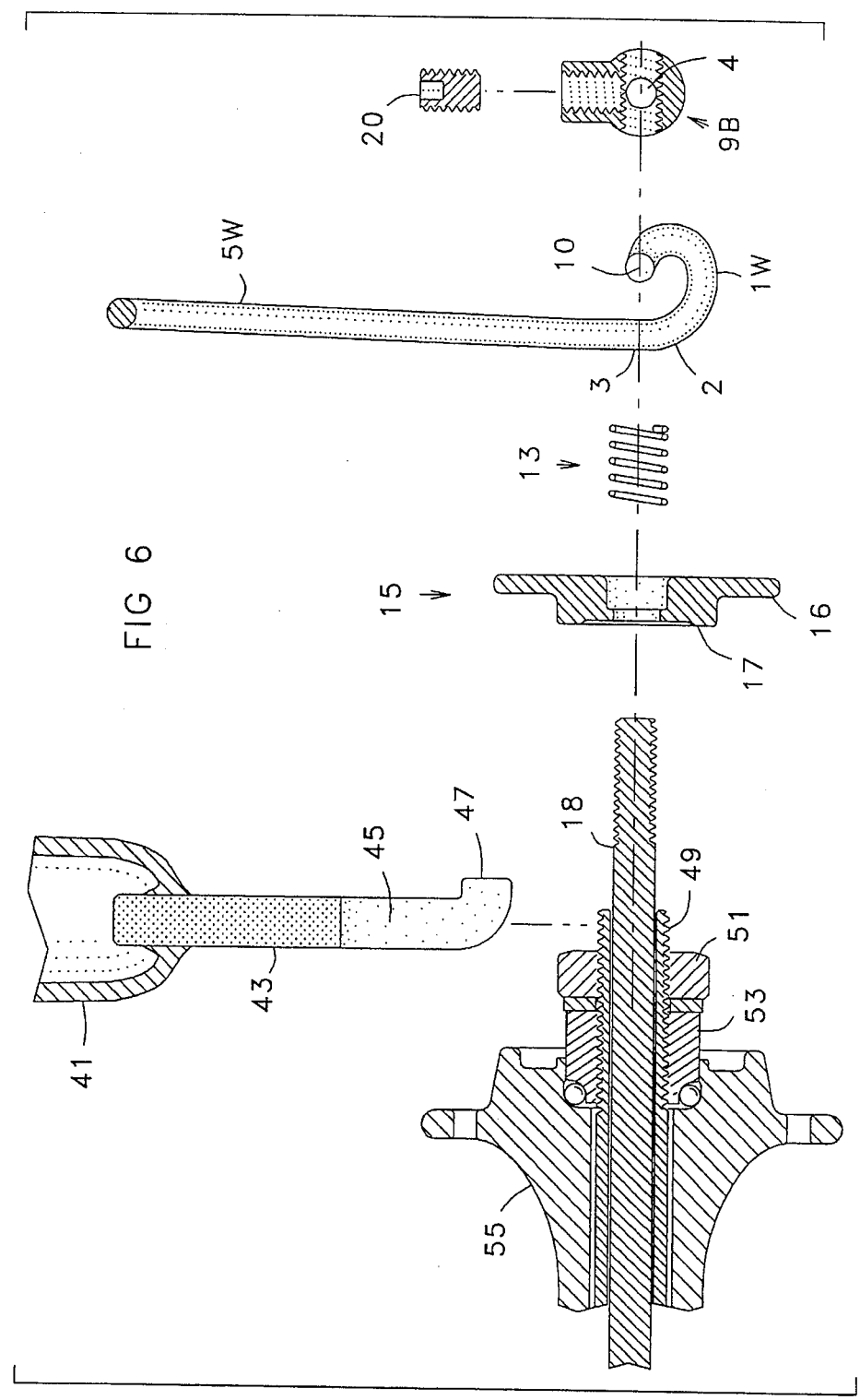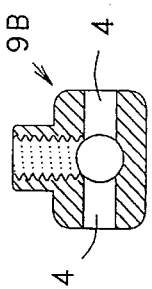

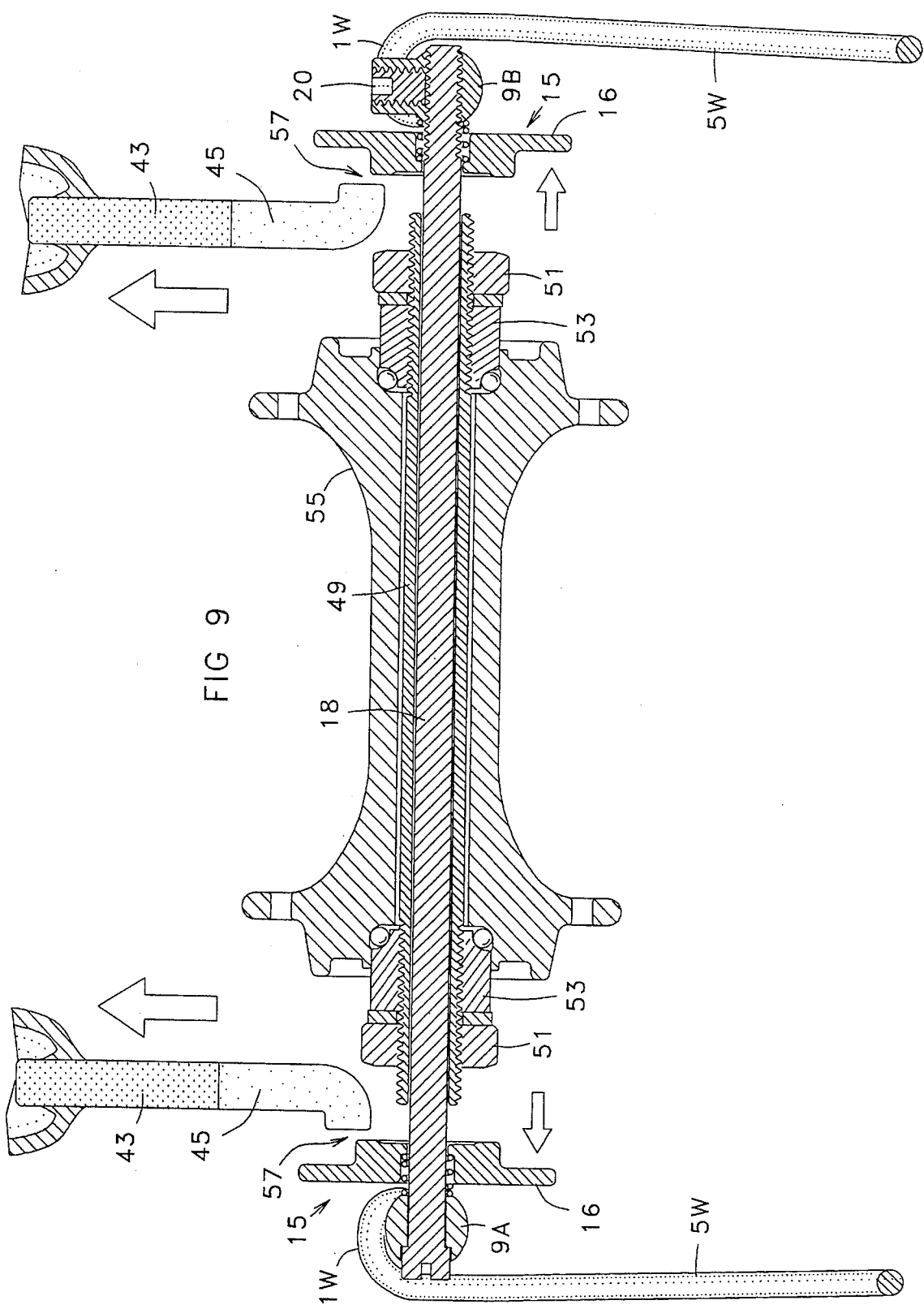

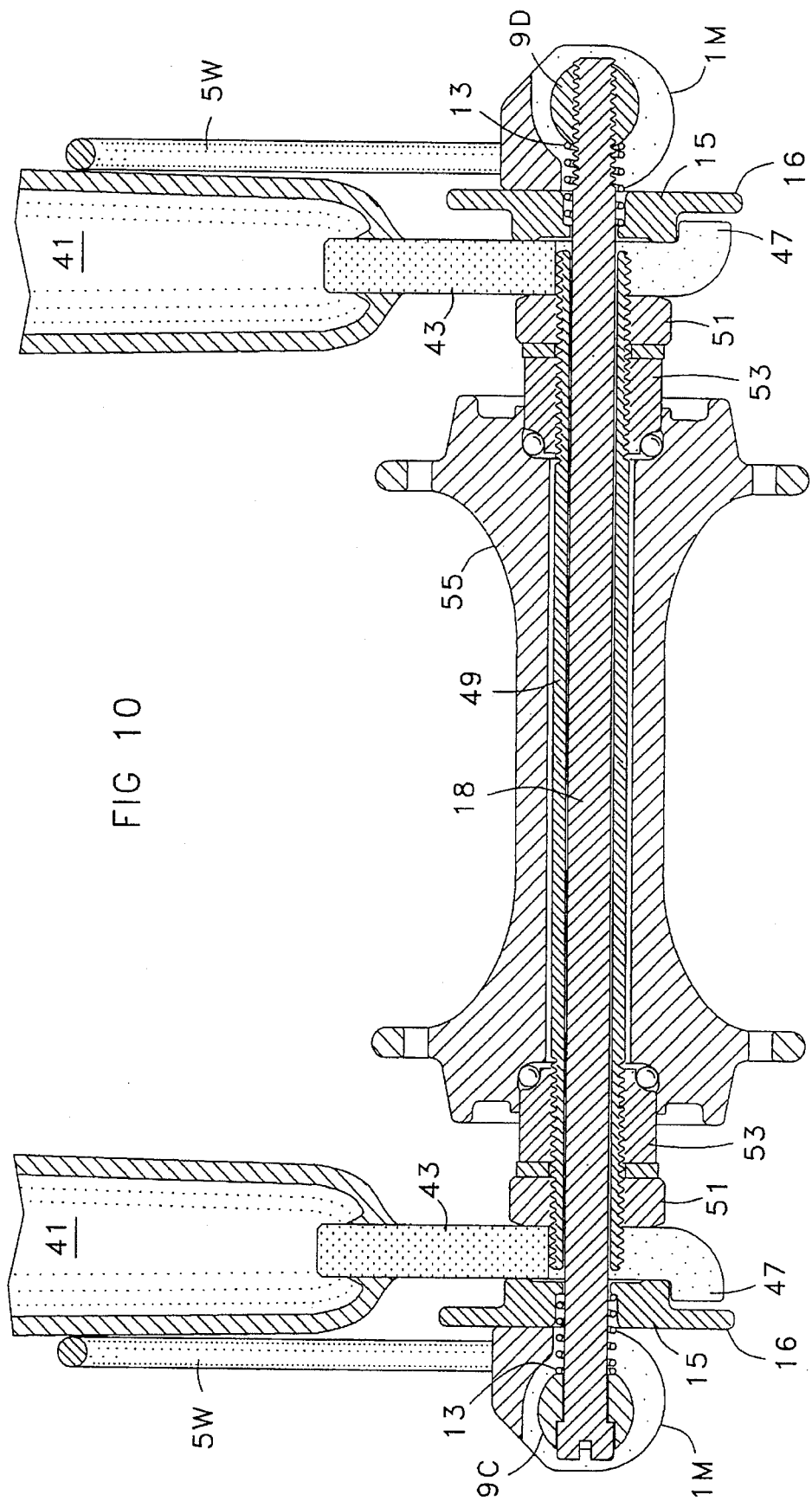

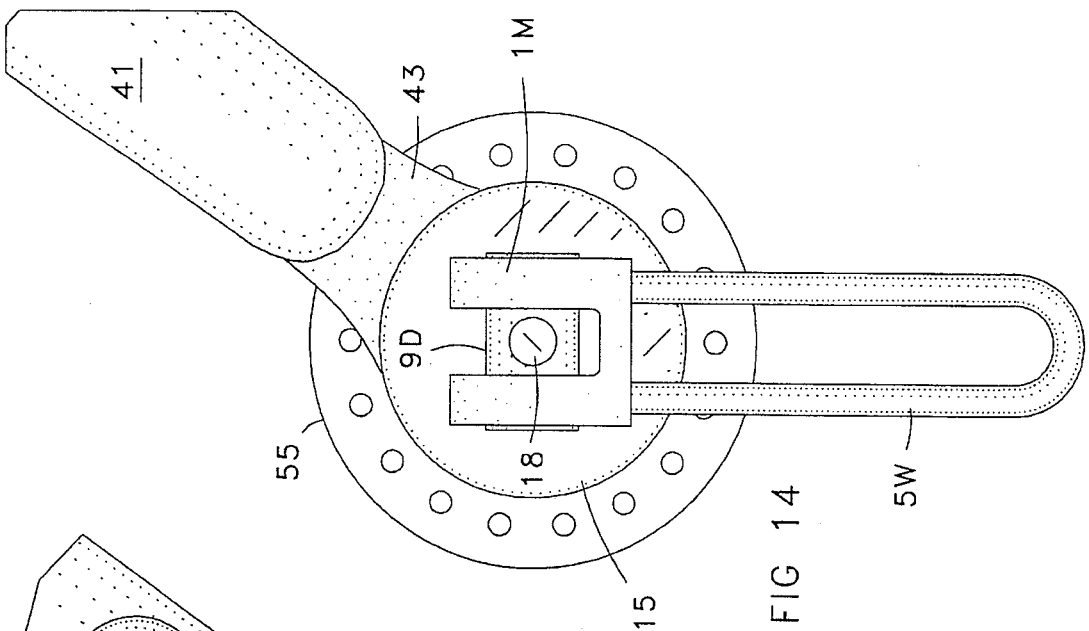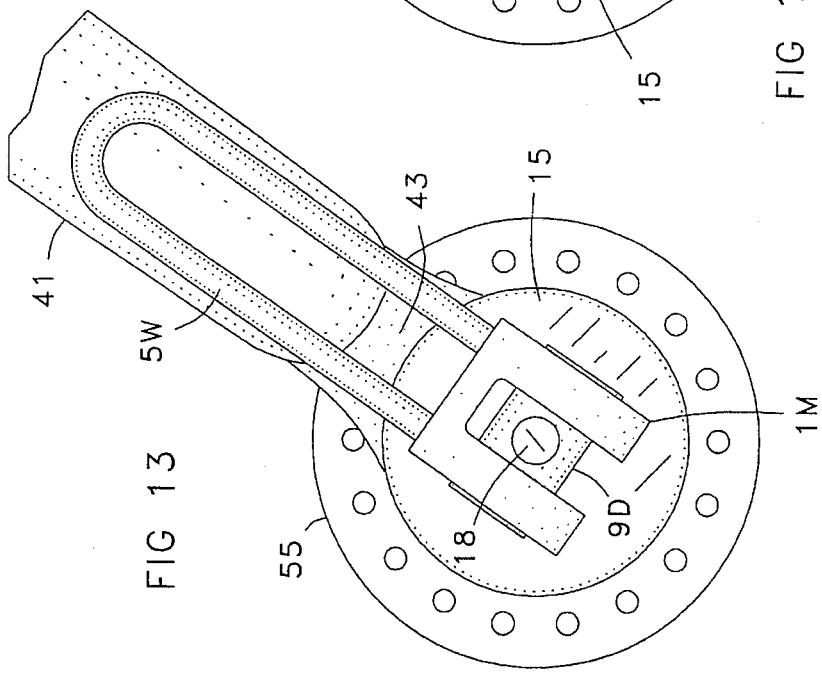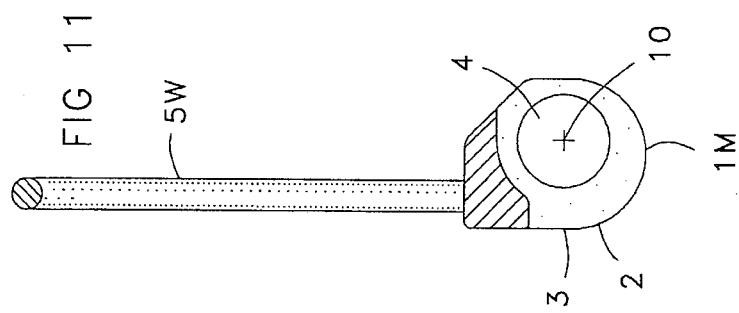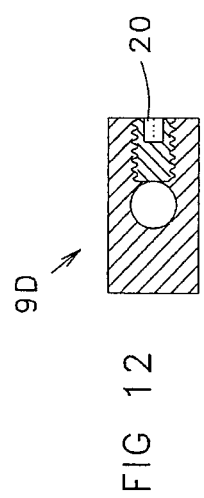

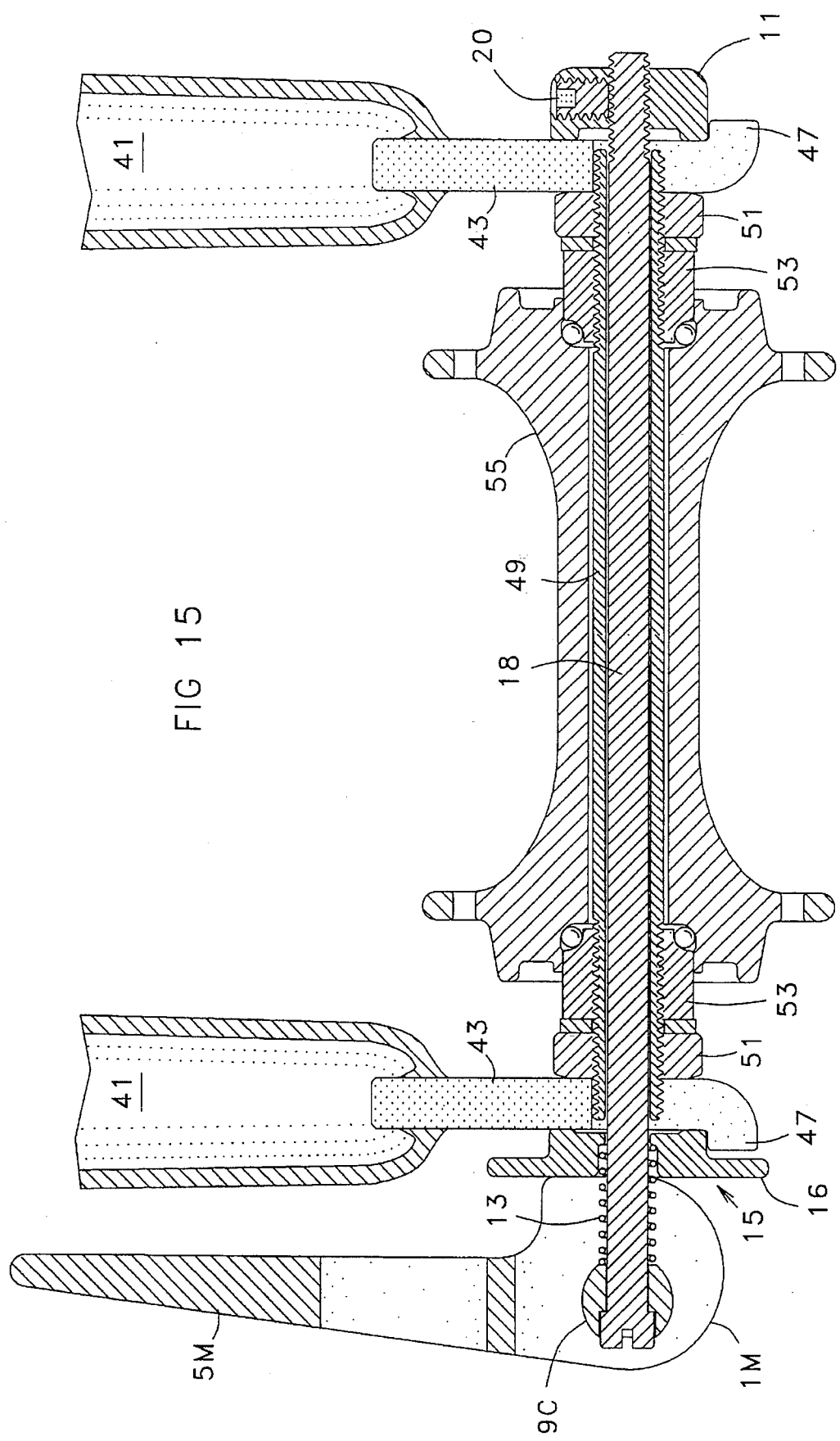

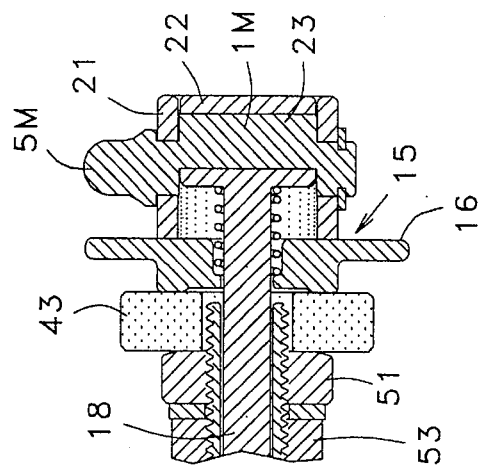
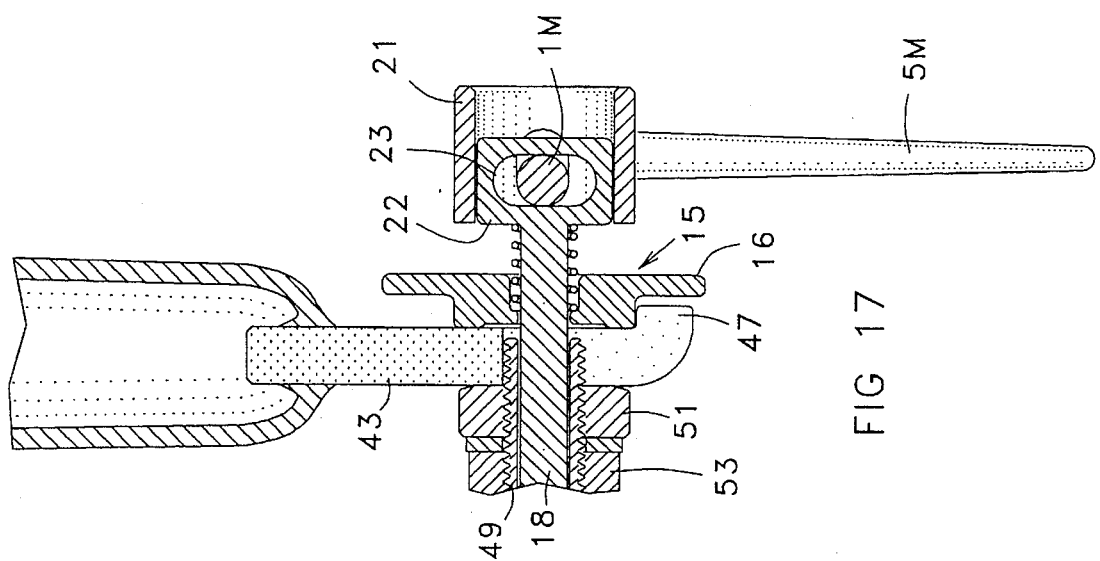
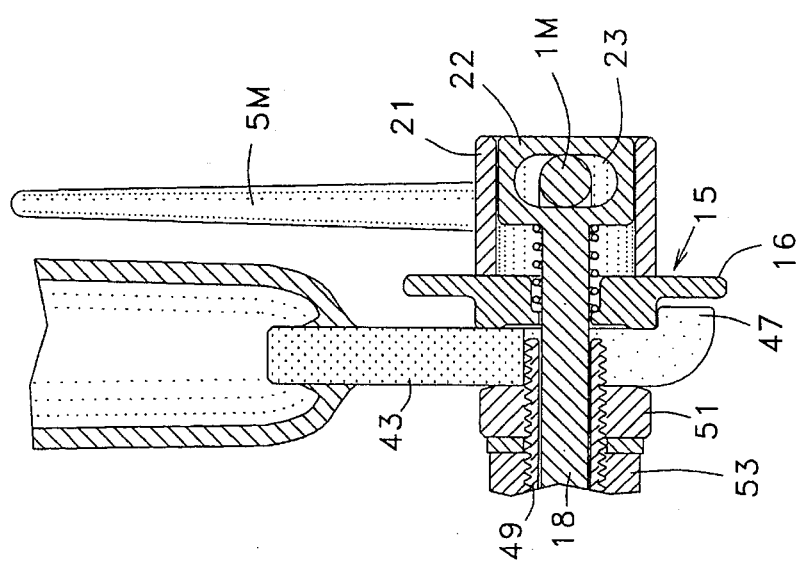
FIG 18
FIG 17
FIG 16

QUICK-RELEASE BICYCLE AXLE FASTENER

RELATED PATENTS

A related U.S. Pat. No. 5383716, "Quick-Release Bicycle Axle Fastener", was issued Jan. 24, 1995 to John V. Stewart and Cal M. Phillips. A less related U.S. Pat. No. 5121973, "Push Button Quick Release Safety Hub Assembly", was issued Jun. 16, 1992 to Cal M. Phillips.

BACKGROUND

1. Field

This invention relates to cam-action quick-release bicycle axle fasteners.

2. Prior Art

Cam-action quick-release axle fasteners for bicycles have been available for years, but existing designs have inherent disadvantages. They can be misadjusted or left disengaged by the user, causing a wheel to wobble or detach while riding. To overcome this, hub makers have designed drop-outs with outer surfaces having depressions, holes, or tabs, which engage a complementary portion of the fastener. This retains the axle despite a loose fastener cam. However, these safety devices have reduced the convenience of quick-release fasteners, since the user must both release the cam and loosen its adjustment nut to release the axle. The nut must then be readjusted each time the axle is attached to the drop-out. Many users are not mechanically competent to perform this adjustment, resulting in a fastener that is dangerously loose or tight.

Numerous other efforts have been made to improve the safety of quick-release axle fasteners. Some of these are now described and contrasted with the present invention.

The quick-release hub of U.S. Pat. No. 4,400,038 (Hosokawa) has a safety mechanism which prevents axle release until the cam lever is fully rotated. However, in the partly rotated position, it is susceptible to release from impacts. The present invention is safer, since it requires the release of both a lever and a slide, and the slide is not susceptible to impacts.

The quick-release hub of U.S. Pat. No. 4,964,287 (Gaul) uses a cam with a removable lever or key for security. The key or lever can be lost. The cam position is hidden, so the user could assume the cam is engaged when it is not. Gaul has no safety interlock. His lock-down washers 26,28 do not serve this function, since they do not hold the axle in the drop-out when the cam is released.

The quick-release hub of U.S. Pat. No. 4805941 (Segawa, FIGS. 4,5) offers a safety interlock. His clamping mechanism needs enough range to fully relax the spring 6 of the interlock, since no radial lip is provided for its disengagement from the drop-out with the fingers. Thus, his interlock is inactive when it is needed most, in the releasing position of the cam lever. When partially rotated, his cam lever is releasable by impact or vibration, defeating the safety. The safety interlock in the present invention works even in the fully releasing position of the cam lever.

The quick-release hub of U.S. Pat. No. 4,805,941 (Downing) has a safety hook for holding the axle in the drop-out. However, it requires a specialized drop-out with the hook assembly, it can be released by impacts, it is vulnerable to damage, and engagement of the hook is optional. The safety interlock of the present invention uses conventional safety drop-outs, will not release due to impacts, is not vulnerable to damage, and its engagement is automatic and not optional.

The related axle fastener of U.S. Pat. No. 5383716 (Stewart and Phillips), solves the above problems. The present invention adapts that fastener to hollow axles, to replace current quick-release fasteners on such axles, and provides a single-lever embodiment.

OBJECTIVES AND SUMMARY

OBJECTIVES

The objective of this invention is a simple, safe, convenient quick-release mechanism for bicycle axles, having the following advantages:

1. Fast, safe wheel removal and attachment without tools.
2. A safety interlock that is automatic and undefeatable, yet convenient.
3. Levers that lock with tangible confirmation.
4. No adjustments needed after assembly.
5. Replaces a current quick-release fastener on a hollow axle.
6. Provides design options, including a single-lever option.

SUMMARY

These objectives are met in the present invention. It uses a lever (5W or 5M) with a cam (1W or 1M) attached to one or both ends of the control rod 18. The cam pushes a safety slide 15 inward against the drop-out 43, clamping the drop-out between the slide and the bearing cone jam nut 51. As shown in FIG. 8, the cam is rotated to release clamping pressure for wheel removal, but spring 13 continues to urge the slide against the drop-out. A safety tab 47, or other coupling surface, on the drop-out, engages the slide to prevent release of the wheel axle until the slide is pulled outward with the fingers (FIG. 9). To remove a wheel, each cam (either one or two cams, depending on the embodiment) is rotated to the loose position, then each slide is pulled outward with the fingers.

This device is safer than current quick-release fasteners. It needs no adjustment after assembly, while current designs require readjustment each time a wheel is re-installed. Spring-loaded safety slides prevent unexpected wheel loss, even if a lever is accidentally left in the released position.

DRAWINGS

FIG. 3 Shows the right side view of FIG. 2.

FIG. 4 Shows the view of FIG. 3, with the cam lever released.

FIG. 5 Show the right side view of a drop-out with safety tabs 47.

FIG. 6 Shows the exploded view of the right half of FIG. 1.

FIG. 7 Shows the side sectional view of cam mount 9B.

FIG. 9 Shows the view of FIG. 8 with the slides 15 released.

FIG. 10 Shows a front sectional view as FIG. 1, using solid cams 1M.

FIG. 11 Shows a front sectional view of cam lever 1M,5W.

FIG. 12 Shows a side sectional view of cam mount 9D.

FIG. 13 Shows the right side view of FIG. 10.

FIG. 14 Shows the view of FIG. 13, with the cam lever released.

FIG. 15 Shows a front sectional view of a single lever design.

FIG. 16 Shows a front sectional view of an alternate cam design in the fastened position.

FIG. 17 Shows the view of FIG. 16 in the released position.

FIG. 18 Shows a top sectional view of FIG. 16.

REFERENCE NUMERALS

Figure 1:
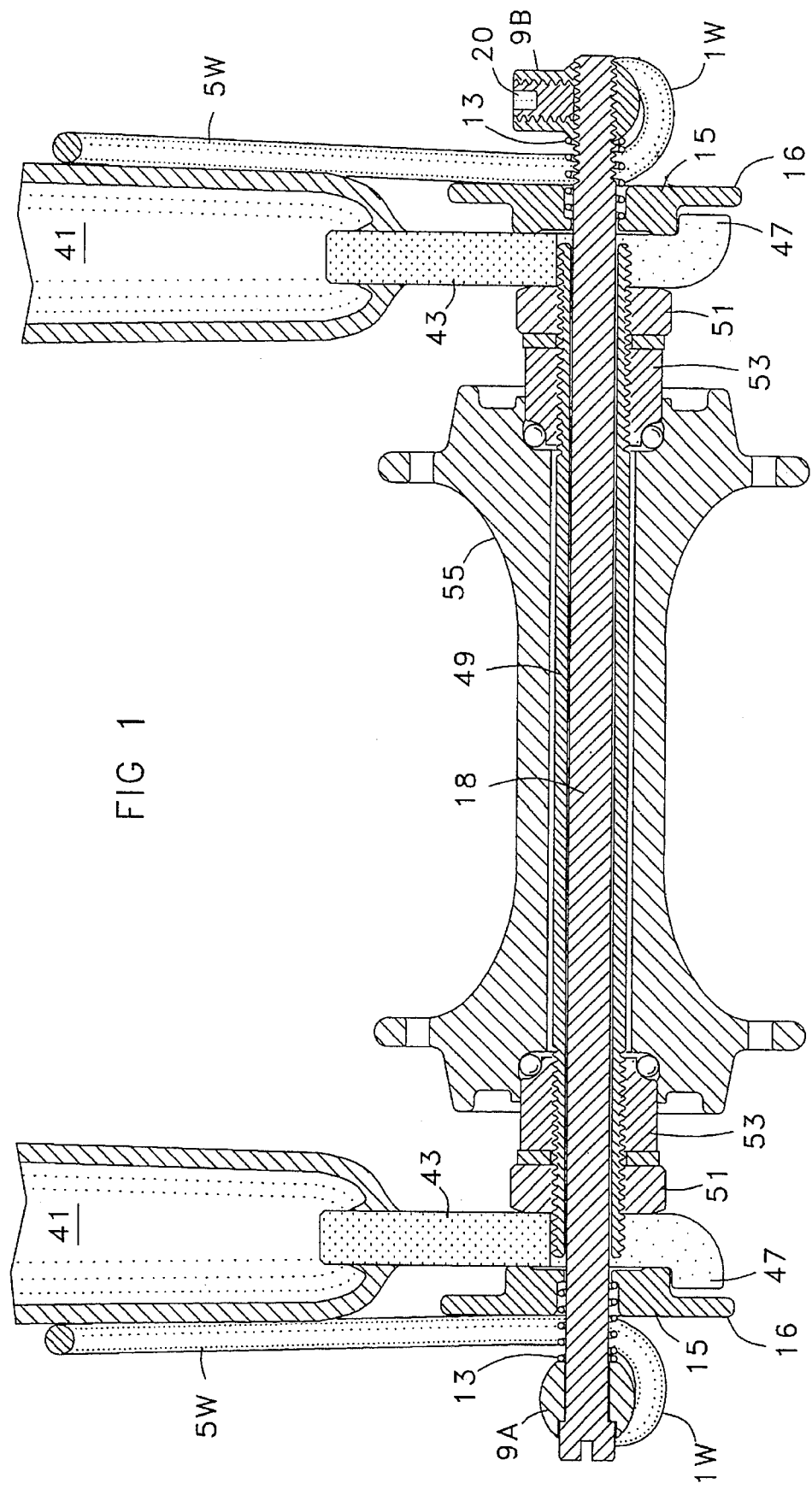
FIG. 1 Shows a front sectional view of a dual lever embodiment with cam levers made of a loop of wire. Fastened position.
Figure 2:
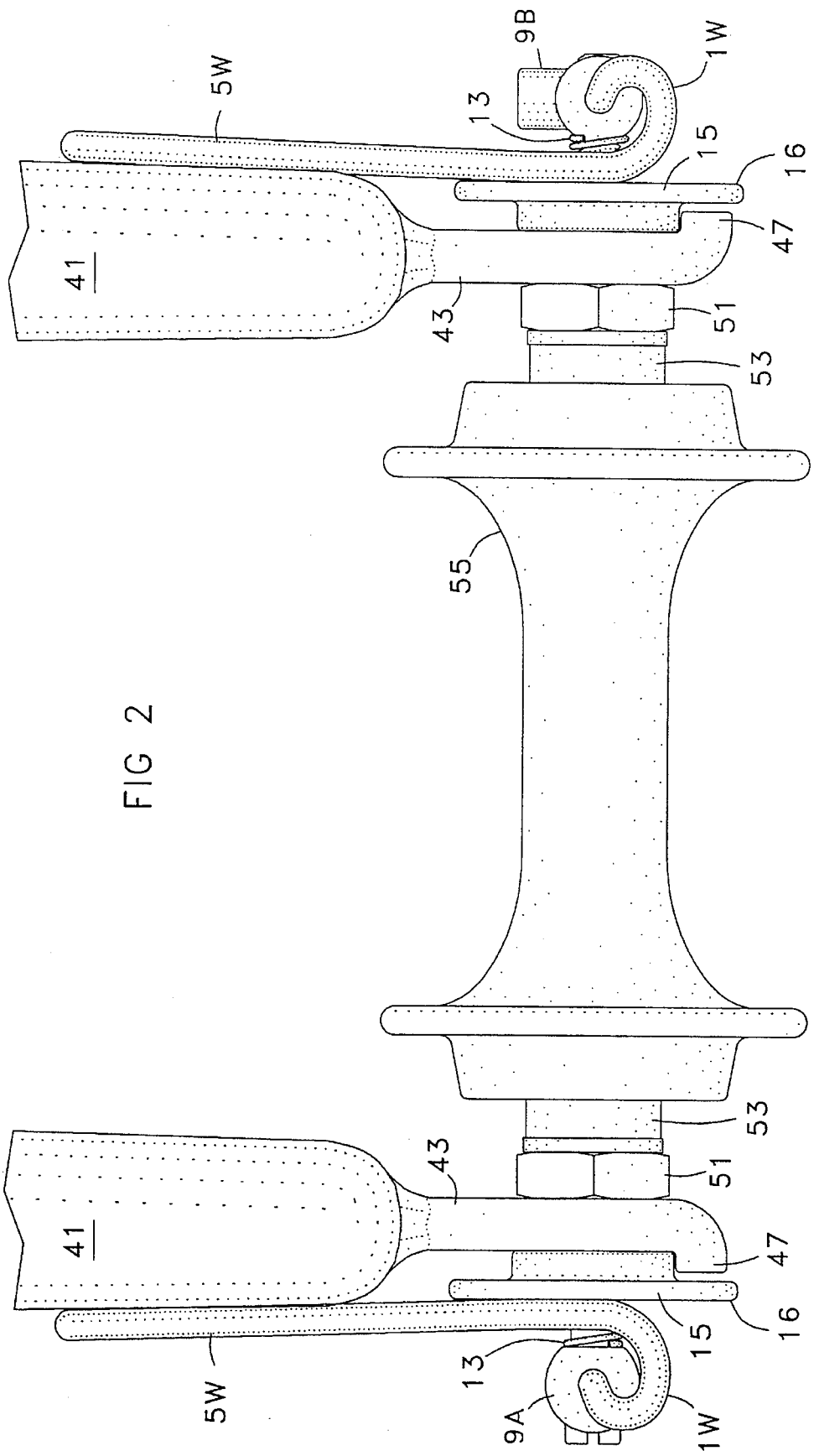
FIG. 2 Shows the front view of FIG. 1.
Figure 8:
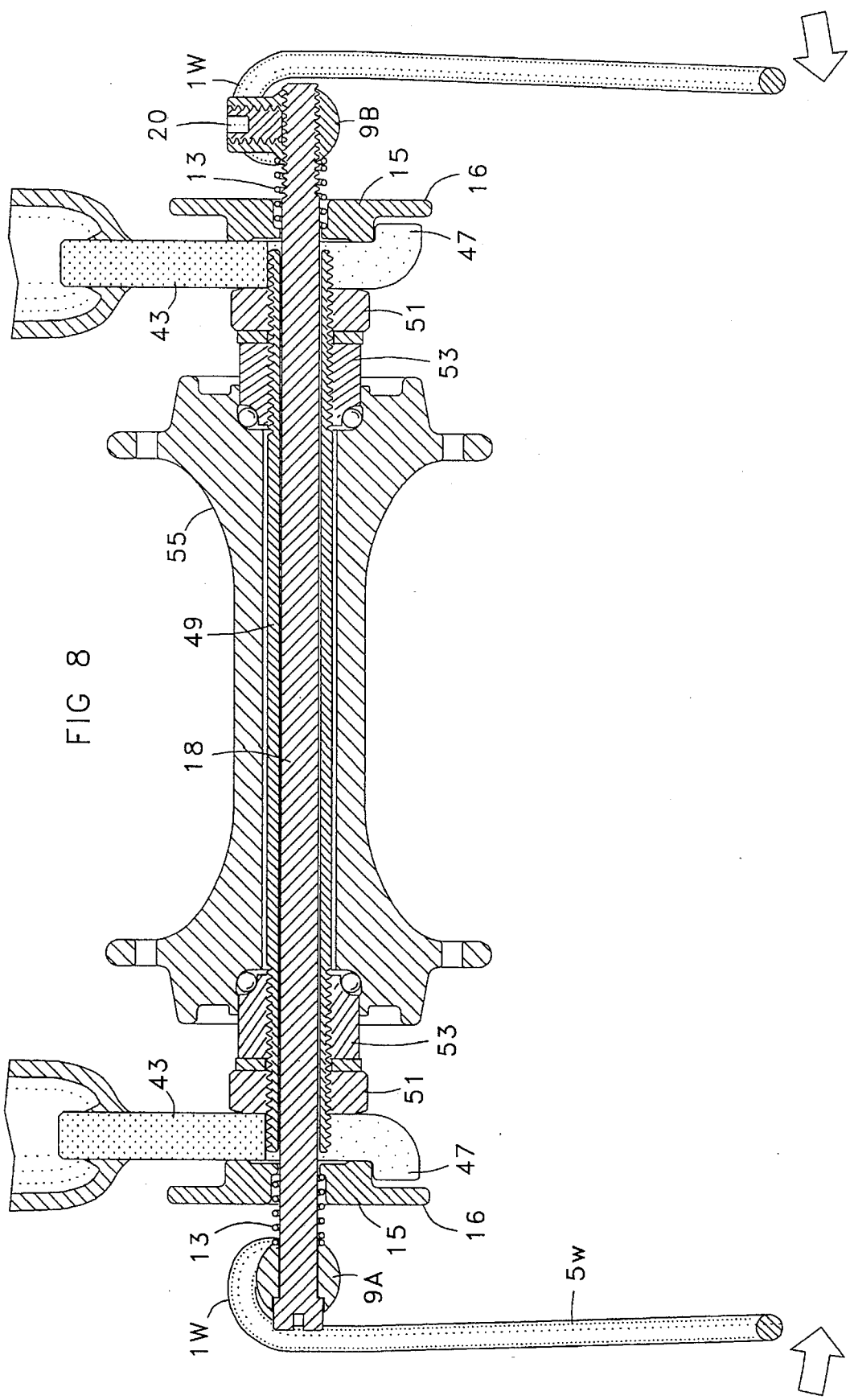
FIG. 8 Shows the view of FIG. 1, with the cam levers 1W, 5W released.

1W. Wire cam
1M. Solid cam (machined, molded, or cast)
2. Cam apex
3. Flat portion of cam
4. Journal for pivot pin
5W. Wire lever
5M. Solid lever (machined, molded, or cast)
9A. Cam pivot mount for wire cam on head of control rod
9B. Cam pivot mount for wire cam on threaded end of control rod
9C. Cam pivot mount for solid cam on head of control rod
9D. Cam pivot mount for solid cam on threaded end of control rod
10. Cam pivot point
11. Adjustment nut
13. Spring
15. Safety interlock slide or washer
16. Radial finger grip or lip on slide
17. Inner surface of slide
18. Control rod or skewer
20. Set screw
21. Intermediate sliding sleeve
22. Cam enclosure
23. Cam chamber
41. Bicycle frame (fork or seat stay)
43. Drop-out
45. Open-ended slot
47. Safety tab or other coupling surface on drop-out
49. Axle
51. Jam nut
53. Bearing cone
55. Hub
57. Clearance between slide and drop-out for release of interlock

TERMINOLOGY cam A mechanical component with a pivot axis, having a working surface that is eccentric or smoothly varying in radial distance from said axis. It may optionally include an intermediate sliding sleeve 21 as in FIGS. 16–18.

cam lever A cam with an attached operating lever.

coaxial Plural components, or different portions of a single component, with a common axis.

drop-out A plate attached to the fork or frame of a velociped, the plate having an open-ended slot for mounting a wheel axle therein.

inboard Relatively closer to the middle of the axle.

outer Laterally farthest from the middle of the axle.

outward In a direction laterally away from the middle of the axle.

radial Perpendicular to an axis. The axis is that of the wheel axle unless otherwise defined.

right, left Relative to a viewer at the front of the bicycle, not the rider.

safety drop-out A drop-out having on its outer surface a coupling contour, such as a protrusion, depression, or hole, that engages a complementary portion of the axle fastener to retain the axle in a back-up mode when the primary fastener mechanism is loose or disengaged.

velociped A human-powered wheeled vehicle.

DESCRIPTION

Referring to FIG. 1: A control rod 18 passes through a hollow axle 49. Attached to at least one end of the control rod is a cam mount. In dual-lever embodiments, a cam mount is attached to each end of the control rod. The cam mount is retained by a head on the control rod, as in 9A (FIG. 1, left side), or it is threaded, as in 9B (FIG. 1, right side). At least one of the cam mounts should freely turn on the control rod, as in 9A. This allows each cam lever to be turned independently to any position at any time by the user without affecting the adjustment of the axle fastener.

The cam mount is shown in four embodiments: 9A and 9B are for a wire cam 1W. 9A is free-turning, while 9B is threaded. 9C and 9D are for a solid cam 1M. 9C is free-turning, while 9D is threaded. The wire cam mounts 9A and 9B have opposed journal holes 4 (FIG. 7) that accept the ends of the wire loop 1W; 5W. The wire ends serve as pivot pins for the wire cam lever. The solid cam mounts 9C and 9D serve as pivot pins themselves, and fit into journal holes 4 in the cam 1M (FIG. 11). The threaded cam mounts are used to adjust the clamping force of the cams. Set screw 20 fixes this adjustment.

A safety interlock slide 15 mates with the coupling surface of a safety drop-out. The coupling surface is shown as a pair of safety tabs 47 (FIG 5) on each side of the open-ended slot 45 of the drop-out 43. Alternately, the coupling surface may comprise a circular depression (not shown) in the outer surface of the drop-out, centered about the closed upper end of the slot 45. The slide 15 has a radial lip 16 which is accessible to users' fingers. The slide must be pulled outward by the user, against spring 13, while the cam lever is released, in order to release the axle from the drop-out. In the dual lever design, each cam is designed with enough range to provide releasing clearance of one slide from the coupling surface of one of the drop-outs, when the slide is pulled outward with the fingers.

When the axle is inserted into the open-ended slot, the slides automatically shift into engagement with the coupling surface of the drop-out, preventing unintentional release of the axle. This safety mechanism is automatic, and cannot be bypassed. In addition, it is convenient to release, so that bypass is not motivated.

A single-lever design is possible (FIG. 15). It is shown with a single safety slide 15 for maximum convenience, although two slides may be provided. An adjustment nut 11 is used in place of a second lever. Adjustment is not needed each time the axle is attached to the drop-out, as with current quick-release axle fasteners. Instead, the cam is designed with enough range to provide releasing clearance of both ends of the fastener from the coupling surface of both safety drop-outs, when the slide(s) are pulled outward with the fingers. Thus, nut 11 can be provided with a set screw 20 to hold the optimum adjustment.

A flat portion 3 (FIG. 6) of the cam may be provided, to stabilize the cam in its locked position, and to indicate when full engagement is reached, via a tangible "click".

Cam mounts for solid cams, such as 9C and 9D (FIGS. 10–15), are shown as cylinders which fit into the pivot journal holes 4 of the cam. This simplifies assembly, since the cam mount can be slipped into its position in the cam through the cam lobes, then attached to the control rod. Pivot pins of reduced diameter (not shown) may extend from each end of the cam mount. This reduces the size of the cam, but either requires the cam lever to be assembled from two halves over the pivot pins, as shown in related U.S. Pat. No. 5383716 FIGS. 9 and 10, or the pins must be pressed into the cam mount through the journal holes in the cam.

A different cam design is shown in FIGS. 16–18. It comprises a cam enclosure 22 on the end of the control rod 18. The enclosure may be an integral special head of the rod, or it may be attached to the rod with threads, press fit, or the like. An intermediate sliding sleeve 21 surrounds the cam enclosure, and has coaxial journals for each end of the cam shaft 1M. The cam shaft 1M is eccentric with its ends, which are coaxial to each other. Thus, when the cam is rotated, the intermediate sleeve is urged inward against the interlock washer, or outward to release the washer. The cam chamber 23 is elongated to accommodate the component of cam motion that is radial to the axle. It also allows the cam shaft to be inserted completely through both the intermediate sleeve and the cam enclosure during assembly. The cam shaft can then be rotatably affixed in this assembly via a circlip (shown in FIG. 18) or a threaded cap nut that bottoms on the threads of the cam shaft before tightening against the sleeve.

Cam designs other than those shown are possible. The details of the cam are not a major distinguishing feature of the invention. Thus, any similar conventional lever-operated means for pressing the interlock washer against the drop-out should be considered equivalent to the cam designs shown herein.

PREFERRED EMBODIMENT

The preferred embodiment is as shown and described in FIGS. 1–9.

OPERATION Wheel Installation:

1. With cam lever(s) released, pull outward on the slide(s) while inserting the axle into the drop-out slot.
2. Rotate the lever(s) to the locked position. Wheel Removal:
1. Rotate the cam lever(s) to the released position.
2. Pull outward on the slide(s) and let the axle fall from the slot.

SCOPE

Specifics in the description and drawings illustrate examples of the invention. The invention is not limited to these particulars, and changes may be made in these particulars without departing from the scope of the invention, which is defined by the claims and their legal equivalents.

I claim:

1. A quick-release axle fastener for attaching a hollow axle to a pair of safety drop-outs on a velociped, comprising:

a control rod inside the axle, having two ends extending therefrom;

a pivot mount attached to at least one end of the control rod;

a safety interlock washer with a finger grip, slidably mounted on the control rod inboard of the pivot mount, which engages the safety drop-out when pressed against it;

a compression spring between the pivot mount and the interlock washer, urging the washer inward;

a lever pivotally attached to the pivot mount, having a fastening position and a releasing position; and means attached to the lever for pressing the washer inward when the lever is rotated from the releasing position to the fastening position;

whereby the pressing means forces the washer against the drop-out when the lever is in the fastening position, and, when the lever is in the releasing position, the washer continues to be urged against the drop-out by the spring until the washer is pulled outward by the fingers of a user, providing an automatic safety backup.

2. The fastener of claim 1 wherein the pivot mount turns freely on the control rod, about the axis of the control rod, whereby the lever can be rotated about the axis of the control rod, independently of the control rod.

3. The fastener of claim 1, wherein the pressing means comprises a cam with a flat portion on its working surface for stabilizing the cam in the engaged position via the flat spot pressed against the interlock washer.

4. The fastener of claim 1, wherein the pivot mount has two opposed pivot journal holes, and the lever is comprised of a loop of wire, bent to form both a cam and lever, with the wire ends inserted into said journal holes.

5. The fastener of claim 1, wherein the pressing means comprises a cam having two lobes which bracket the pivot mount, on opposite sides thereof, each lobe has a pivot journal hole, and the pivot mount has two opposed pivot pins inserted into said journal holes.

6. The fastener of claim 5, wherein the pivot mount is cylindrical, with a diameter that fits within the journal holes, and the cylinder serves continuously as both a mount upon the control rod and a pivot pin within the journal holes.

7. A fastener for attaching a hollow wheel axle having two ends to a pair of safety drop-outs on a velociped, the fastener comprising:

a control rod passing through the axle;

a pivot mount attached to an end of the control rod;

an interlock washer, slidably mounted on the control rod inboard of the pivot mount, having an inboard mating surface which engages the safety drop-out, and having a radial finger grip;

a compression spring between the interlock washer and the pivot mount;

a cam having a pivot axis rotatably mounted on the pivot mount, with the pivot axis perpendicular to the control rod; and a lever attached to the cam;

whereby the lever rotates the cam, forcing the washer against the drop-out, and when cam pressure is released, the mating surface of the interlock washer continues to be urged against the drop-out by the spring until the washer is pulled outward by the fingers of a user.

8. The fastener of claim 7 wherein the pivot mount turns freely on the control rod, about the axis of the control rod, whereby the cam lever can be rotated about the axis of the control rod, independently of the control rod.

9. The fastener of claim 7, wherein the cam has a flat portion on its working surface for stabilizing the cam in the engaged position via the flat spot pressed against the slide.

10. The fastener of claim 7, wherein the pivot mount has two opposed pivot journal holes, and the cam lever is comprised of a loop of wire, bent to form both a cam and lever, with the wire ends inserted into said journal holes.

11. The fastener of claim 7, wherein the cam comprises two lobes which bracket the pivot mount, on opposite sides thereof, each lobe has a pivot journal hole, and the pivot mount has two opposed pivot pins inserted into said journal holes.

12. The fastener of claim 11, wherein the pivot mount is cylindrical, with a diameter that fits within the journal holes, and the cylinder serves continuously as both a mount upon the control rod and a pivot pin within journal holes.

13. A fastener for attaching a hollow wheel axle with two ends to a pair of safety drop-outs on a velociped, the fastener comprising:

a control rod passing through the axle;

a pivot mount attached to each end of the control rod;

a cam pivotally mounted on each pivot mount, having a pivot axis perpendicular to the control rod;

a lever attached to each cam;

an interlock washer slidably mounted on the control rod inboard of each pivot mount, each washer having an inboard mating surface which engages the corresponding safety drop-out, and having a radial finger grip; and a compression spring between each interlock washer and the corresponding pivot mount;

whereby each lever rotates the attached cam, which forces the corresponding washer against the corresponding drop-out, and when cam pressure is released, the mating surface of the washer is urged against the drop-out by the spring until the washer is pulled outward by the fingers of a user.

14. The fastener of claim 13 wherein at least one of the pivot mounts turns freely on the control rod, about the axis of the control rod, whereby the corresponding cam lever can be rotated about the axis of the control rod, independently of the control rod.

15. The fastener of claim 13, wherein each cam comprises two lobes which bracket the corresponding pivot mount, on opposite sides thereof, each lobe has a pivot journal hole, and the pivot mount has two opposed pivot pins inserted into said journal holes.

16. The fastener of claim 15, wherein the corresponding pivot mount is cylindrical, with a diameter that fits within the journal holes, and the cylinder serves continuously as both a mount upon the control rod and a pivot pin within the journal holes.

* * * * *